US009997157B2

(12) United States Patent
Akbacak et al.

(10) Patent No.: US 9,997,157 B2
(45) Date of Patent: Jun. 12, 2018

(54) KNOWLEDGE SOURCE PERSONALIZATION TO IMPROVE LANGUAGE MODELS

(71) Applicant: Microsoft Corporation, Redmond, WA (US)

(72) Inventors: Murat Akbacak, Burlingame, CA (US); Dilek Z. Hakkani-Tur, Los Altos, CA (US); Gokhan Tur, Los Altos, CA (US); Larry P. Heck, Los Altos, CA (US); Benoit Dumoulin, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 14/280,070

(22) Filed: May 16, 2014

(65) Prior Publication Data

US 2015/0332672 A1    Nov. 19, 2015

(51) Int. Cl.
    *G06F 17/30*     (2006.01)
    *G10L 15/06*     (2013.01)
    *G10L 15/18*     (2013.01)
    *G10L 15/07*     (2013.01)

(52) U.S. Cl.
    CPC ........ *G10L 15/18* (2013.01); *G06F 17/30654* (2013.01); *G06F 17/30734* (2013.01); *G06F 17/30766* (2013.01); *G10L 15/07* (2013.01)

(58) Field of Classification Search
    CPC ................................ G06F 17/30; G06Q 30/00
    See application file for complete search history.

(56) References Cited

U.S. PATENT DOCUMENTS

| 6,442,519 B1 | 8/2002 | Kanevsky et al. |
| 6,484,136 B1 | 11/2002 | Kanevsky et al. |
| 8,170,866 B2 | 5/2012 | Gilbert et al. |
| 9,256,682 B1* | 2/2016 | Li ............... G06F 17/30958 |
| 2010/0057687 A1* | 3/2010 | Shen ............ G06F 17/3064 |

(Continued)

FOREIGN PATENT DOCUMENTS

EP    1791114 A1    5/2007

OTHER PUBLICATIONS

Sarwar et al., "item-based collaborative filtering recommendation algorithms", May 1-5, 2001, WWW10, p. 1-15.*

(Continued)

*Primary Examiner* — Shreyans Patel
(74) *Attorney, Agent, or Firm* — Shook, Hardy & Bacon LLP

(57) ABSTRACT

Systems and methods are provided for improving language models for speech recognition by personalizing knowledge sources utilized by the language models to specific users or user-population characteristics. A knowledge source, such as a knowledge graph, is personalized for a particular user by mapping entities or user actions from usage history for the user, such as query logs, to the knowledge source. The personalized knowledge source may be used to build a personal language model by training a language model with queries corresponding to entities or entity pairs that appear in usage history. In some embodiments, a personalized knowledge source for a specific user can be extended based on personalized knowledge sources of similar users.

20 Claims, 6 Drawing Sheets

(56) References Cited

U.S. PATENT DOCUMENTS

2011/0077942 A1* 3/2011 Ljolje .............. G10L 15/065
 704/244
2012/0316877 A1 12/2012 Zweig et al.
2013/0080162 A1 3/2013 Chang et al.

OTHER PUBLICATIONS

Heck, et al., "Exploiting the Semantic Web for Unsupervised Spoken Language Understanding", In IEEE Spoken Language Technology Workshop, Dec. 2012, 6 pages.

Hakkani-Tur, et al., "Using a Knowledge Graph and Query Click Logs for Unsupervised Learning of Relation Detection", In IEEE International Conference on Acoustics, Speech and Signal Processing, May 2013, 5 pages.

Atagana, Michelle, "Google Knowledge Graph and the Future of Voice-Activated Intelligent Search", Published on: May 8, 2013, Available at: http://memeburn.com/2013/05/google-knowledge-graph-and-the-future-of-voice-activated-intelligent-search/.

Hakkani-Tur, et al., "A Weakly-Supervised Approach for Discovering New User Intents from Search Query Logs", In Annual Conference of the International Speech Communication Association, Aug. 25, 2013, 5 pages.

Heck, et al., "Leveraging Knowledge Graphs for Web-Scale Unsupervised Semantic Parsing", In Proceedings of International Speech Communication Association, Aug. 25, 2013, 5 pages.

Celikyilmaz, et al., "Leveraging Web Query Logs to Learn User Intent Via Bayesian Discrete Latent Variable Model", In Proceedings of 28th International Conference on Machine Learning, Dec. 10, 2013, 6 pages.

Li, et al., "Leveraging Multiple Query Logs to Improve Language Models for Spoken Query Recognition", In IEEE International Conference on Acoustics, Speech and Signal Processing, Apr. 2009, 4 pages.

Hillard, et al., "Learning Weighted Entity Lists from Web Click Logs for Spoken Language Understanding", In 12th Annual Conference of the International Speech Communication Association, Aug. 28, 2011, 4 pages.

"International Preliminary Report on Patentability Issued in PCT Application No. PCT/US2015/031075", dated Aug. 5, 2016, 9 Pages.

"Second Written Opinion Issued in PCT Application No. PCT/US2015/031075", dated May 11, 2016, 8 Pages.

"International Search Report and Written Opinion Issued in PCT Application No. PCT/US2015/031075", dated Aug. 28, 2015, 10 Pages.

* cited by examiner

KNOWLEDGE SOURCE PERSONALIZATION TO IMPROVE LANGUAGE MODELS

BACKGROUND

Voice-enabled human-machine conversational systems, such as voice interaction with entertainment systems or personal devices, depend on accurate recognition of a user's speech. For example, effective voice-search applications must accurately recognize user-submitted queries so that information returned to the user correlates with the user's intent in submitting the query. The accuracy of such systems can be improved by personalizing the language models or spoken language understanding (SLU) models used by such systems to the specific user, or groups of similar users, instead of an overall user population.

Existing approaches for personalizing language and SLU models rely primarily on certain types of past utterances by the user and personal usage patterns from user logs. These approaches assume lexical similarity to future utterances, such as future user queries; i.e., the user will ask the same questions as before. But these approaches are ineffective for future utterances that are semantically or categorically similar but contain different content. In particular, they do not provide a solution for expanding on already observed word sequence patterns in order to predict unseen user queries.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed to systems and methods for improving language models for speech recognition by tailoring knowledge sources utilized by the language models to specific users or user-population characteristics. In particular, a knowledge source, such as a knowledge graph, may be personalized for a particular user by incorporating personal usage history information for that user. As will be further described, in one embodiment, personal usage history can include the user's web query logs, desktop or personal device query logs, social networking interactions, websites visited, and similar user-interaction information. From this data, entities and user action information may be identified, extracted, and projected or mapped onto the knowledge source, thereby personalizing the knowledge source to the user. The personalized knowledge sources can then be used to build personal language models by training a language model with queries corresponding to entities or entity pairs that appear in the user's usage history information.

Some embodiments further include using the personalized knowledge sources to identify users with similar interests or intents. In this way, language models may be built based on the population characteristics in common to the similar users. Moreover, where personal usage history for a target user is sparse or unknown, a knowledge source personalized for that target user may be extended or enhanced based on the knowledge sources personalized to similar users.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed to systems, methods, and computer storage media for, among other things, improving language models or SLU models for speech recognition by tailoring knowledge sources utilized by the language models to specific users or user-population characteristics. In particular, a knowledge source, such as a knowledge graph, may be personalized for a particular user by incorporating user information into the knowledge source, thereby creating a personalized knowledge source.

Various personal sources of information for a user and more generalized knowledge sources, such as domain databases and knowledge graphs, may be utilized when creating the personalized knowledge source. The personalized knowledge sources then may be used to build personalized language models, such as by training a language model with queries corresponding to entities or entity pairs that appear in the user's usage history information. For example, in one embodiment, a personalized knowledge graph is generated by mapping personal usage history information from various personal sources, such as query logs and social network interactions, onto a generic knowledge graph. The personalized knowledge graph is then used to customize language models for the user to improve speech recognition, such as by using entity relationships in the personalized knowledge graph to predict the user's future queries.

Some embodiments further include using the personalized knowledge sources to identify users with similar interests or intents, such as by clustering. In this way, language models may be built based on the population characteristics in common to the similar users. Moreover, a knowledge source personalized for a target user may be extended or enhanced based on the knowledge sources personalized to similar users. Thus, where personal usage history for a new user is sparse or unknown, information from similar users, including for example, information about entity, entity-relationship pairs, intents, or entity popularity, may be used for training a language model for the new user.

Figure 1:
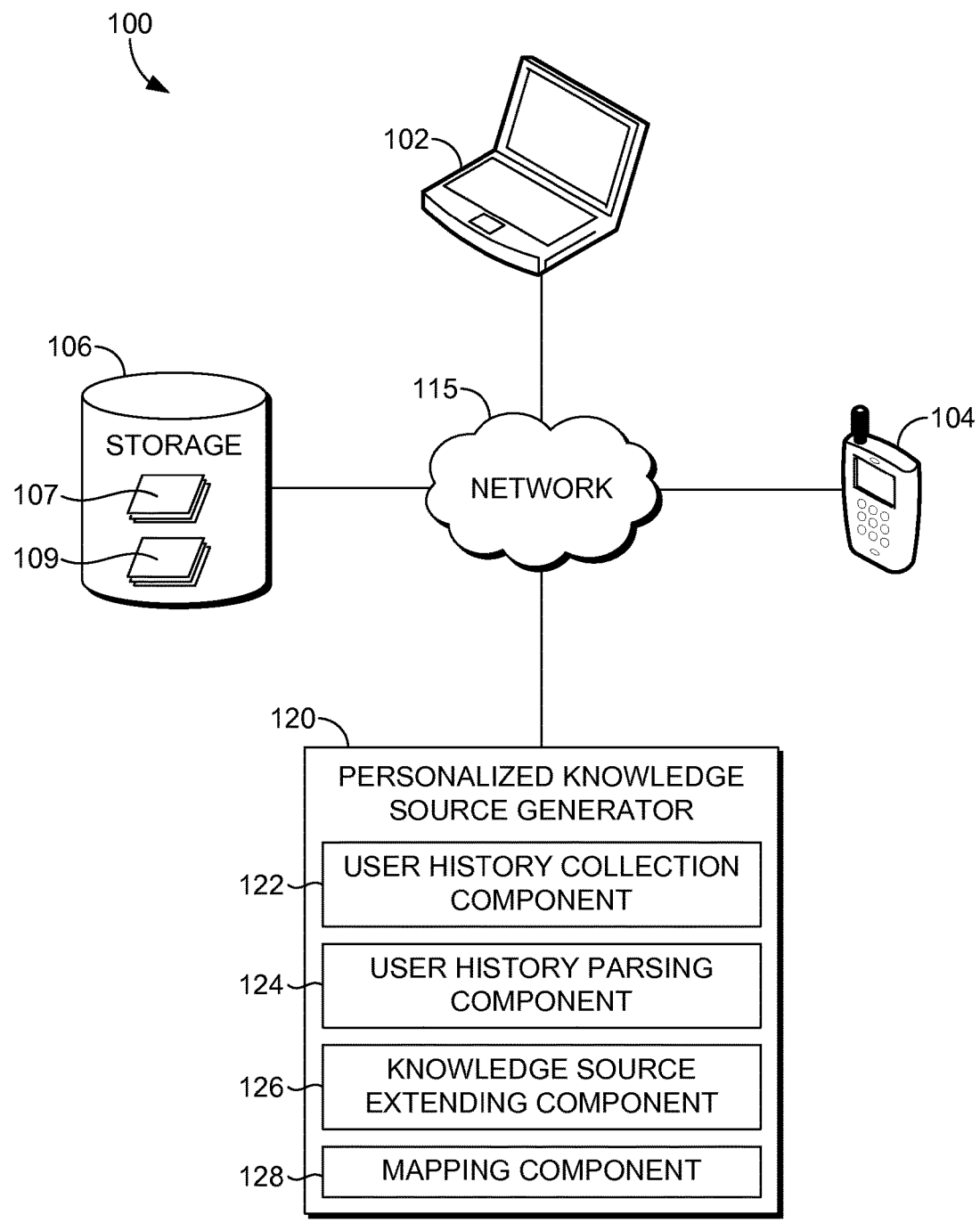
FIG. 1 is a block diagram of an example system architecture in which an embodiment of the invention may be employed.

Turning now to FIG. 1, a block diagram is provided showing aspects of an example system architecture suitable for implementing an embodiment of the invention and designated generally as system 100. It should be understood that this and other arrangements described herein are set forth only as examples. Thus, system 100 represents only one example of suitable computing system architectures. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, system 100 includes network 115 communicatively coupled to one or more user devices (e.g., items 102 and 104), storage 106, and a personalized knowledge source generator 120. The components shown in FIG. 1 may be implemented using one or more computing devices, such as computing device 600 described in connection to FIG. 6. Network 115 may include, without limitation, one or more local area networks (LANs) and/or wide area networks (WANs). Such networking environments are commonplace in offices, enterprise-wide computer networks, intranets, and the Internet. It should be understood that any number of user devices, storage components, and personalized knowledge source generators may be employed within the system 100 within the scope of the present invention. Each may comprise a single device or multiple devices cooperating in a distributed environment. For instance, the personalized knowledge source generator 120 may be provided via multiple devices arranged in a distributed environment that collectively provide the functionality described herein. Additionally, other components not shown may also be included within the network environment. For example, a knowledge graph data store may also be provided to separately store knowledge graphs that can easily be accessed by the embodiments described herein.

Example user devices 102 and 104 each comprise any type of user device capable of receiving input from a user, such as described below. Although FIG. 1 shows two example user devices 102 and 104, a user may be associated with only one user device or more than two devices. In some embodiments, a user device receiving input from a user is associated with user identification for the user.

Figure 6:
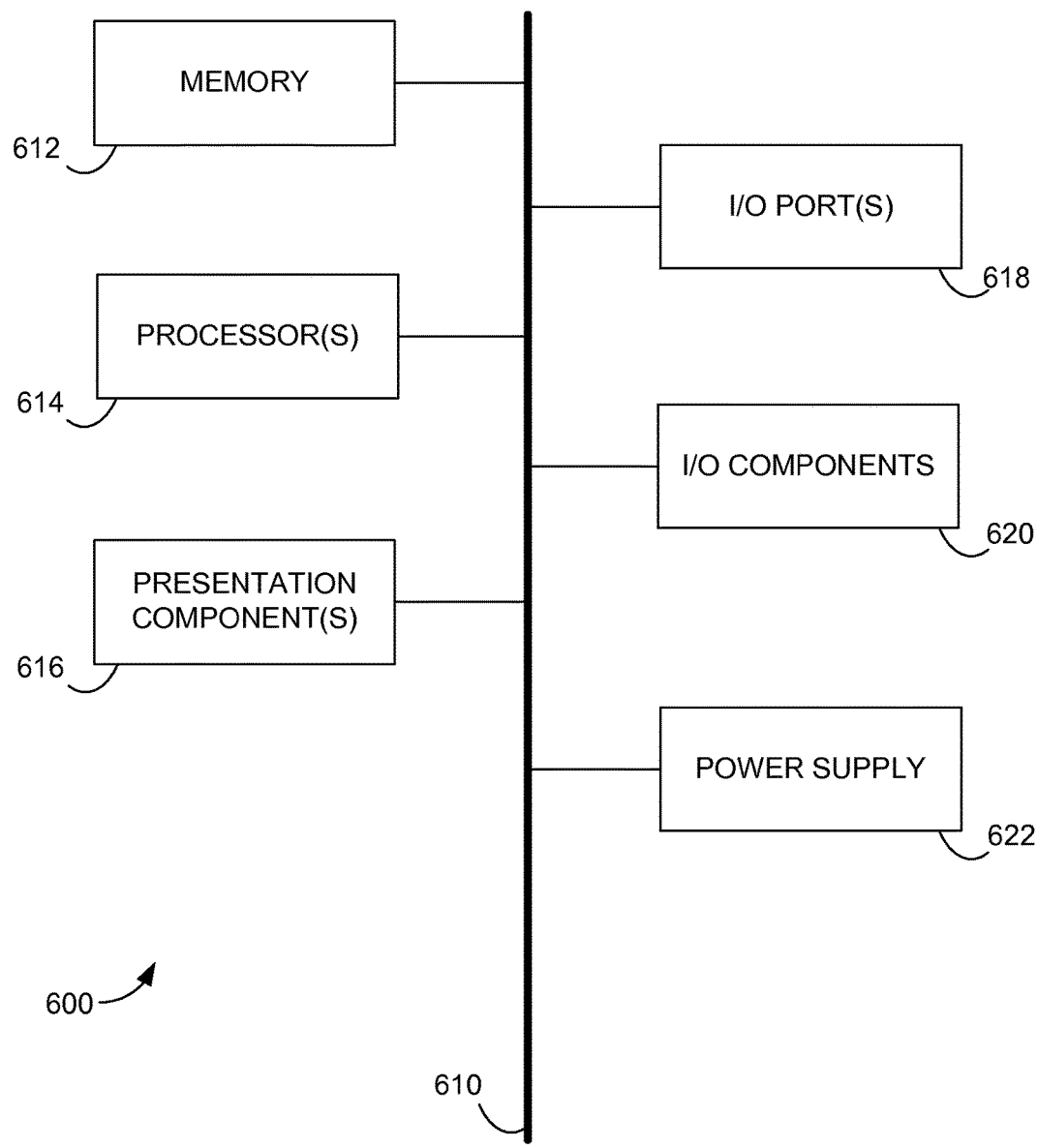
FIG. 6 is a block diagram of an exemplary computing environment suitable for use in implementing embodiments of the present invention.

In one embodiment, user devices 102 and 104 may be the type of computing device described in relation to FIG. 6 herein. By way of example and not limitation, a user device may be embodied as a personal data assistant (PDA), mobile device, laptop, tablet, remote control, entertainment system, vehicle computer system, embedded system controller, appliance, consumer electronic device, or other electronics device capable of receiving input from a user. The input may be received by one of many different modalities, such as by way of example and not limitation, voice or sound, text, touch, click, gestures, the physical surroundings of the user, or other input technologies described in connection to FIG. 6. For instance, a user may utilize a search engine to input a query, intending to receive information highly relevant to the query. Or, a user may interact with one or more social networking websites and provide input that the user intends to share with friends or even strangers. The user may also interact with the social networking websites indicating that the user has read and likes another user's posting. Still yet, a user may use voice commands with a gaming system, television, etc. All of these forms of input, as well as others not specifically mentioned herein, are contemplated to be within the scope of the present invention.

Storage 106 generally stores one or more knowledge sources 107 and personal sources 109 that are used, in one embodiment, to build language models to improve speech recognition, such as to accurately determine the possibility of the user's next utterance. In some embodiments, the one or more language models (not shown), including language models built from knowledge sources 107 and/or language models build from knowledge sources 107 and personal sources 109 are also stored in storage 106. Further, although depicted as a single data store component, storage 106 may be embodied as one or more data stores, or may be in the cloud.

Knowledge sources 107 include, in one embodiment, relational databases including domain databases, knowledge bases, knowledge graphs, or similar information sources. In one embodiment, knowledge sources 107 comprise a structured semantic knowledge base such as the Semantic Web. By way of background, the Semantic Web (or similar structured knowledge bases or web-scale semantic graphs) can be represented using the Resource Description Framework (RDF), which is a triple-based structure of association that typically includes two entities linked by some relation and is similar to the well-known predicate/argument structure. An example would be "directed_by (*Avatar*, James Cameron)." As RDFs have increased in use and popularity, triple stores (referred to as knowledge bases or knowledge graphs) covering various domains have emerged, such as Freebase.org. In one embodiment, knowledge sources 107 include one or more knowledge graphs (or relational graphs), which include sets of triples indicating a relation between two entities (e.g., *Avatar*—directed by—James Cameron), and which may be compiled into a graph structure. An example knowledge graph is provided in FIG. 2, which illustrates exemplary entities and their relationships, and will be discussed in greater detail herein.

In one instance, the knowledge source identifies at least one entity. As used herein, the term entity is broadly defined to include any type of item, including a concept or object, that has potential relationships with other items. For example, an entity may include the movie "*Life is Beautiful*," the director "Roberto Benigni," and the award "Oscar." These three entities are related, in that the movie "*Life is Beautiful*" is directed by "Roberto Benigni," and the movie also won an Oscar. Multiple entities related in some manner typically comprise a domain, which may be considered as a category of entities, such as movies, exercise, music, sports, businesses, products, organizations, etc.

Personal sources 109 include one or more sources of information for a user. By way of example and not limitation, such user information can include a user's query logs, including queries submitted, query results, and/or clicked-on results; websites visited and browser history; online purchase history; social networking interactions; and other user-interaction information or usage history. In one embodiment, user information includes actions taken on a user device (such as items 102 or 104), which may be correlated with a user ID.

Storage 106 may also store the personalized knowledge sources or extended personalized knowledge sources generated according to embodiments described herein. For example, as will be further described, a personalized knowledge source is customized for a particular user and may be used to customize a language model for improving speech recognition for that particular user. An extended personalized knowledge source is customized to a particular user but also includes mappings from other users having similar interests to the user associated with the personalized knowledge source. When we refer to mappings herein, we are referring to the process of taking data from one or more personal sources and aligning it or mapping it to a knowledge source.

In one embodiment, where the data includes a specific entity or entity-type, the entity or entity-type may be identified in a personalized knowledge source, such as a knowledge graph, and a count is added to that entity or entity-type. Thus, the personalized knowledge source becomes a probabilistic personalized knowledge source. For example, if the data includes the name of a movie "Life is Beautiful," that movie name is located in the user's personalized knowledge graph and the current count of that entity is increased by one. Other methods of mapping are contemplated to be within the scope of embodiments of the invention as well. For instance, an algorithm may be used to provide or calculate a weight for each entity and/or entity-type. In such embodiments, the algorithm may use a one-to-one counting method or may take into account different factors, such as from which source the entity or entity-type was mentioned, how a user indicated an interest in that entity or entity-type, etc. In one embodiment, where a personalized knowledge source of a target user is extended, weighting from the personalized knowledge source may be used to scale the counts of certain N-grams coming from other users' queries, so that the target user's interests or intents are still represented.

Personalized knowledge source generator 120 comprises a user history collection component 122, a user history parsing component 124, a knowledge source extending component 126, and a mapping component 128. Personalized knowledge source generator 120 is configured to generate personalized knowledge sources and extended personalized knowledge sources utilizing personal source data from a particular user or from other users determined to be similar to the particular user. In one embodiment, personal knowledge source generator 120 may be implemented on one or more user devices, such as user devices 102 and 104, on a server or backend component (not shown) or on a distributed platform (not shown) in the cloud.

At a high level, in one embodiment, a personalized knowledge source is created by mapping personal-source data to a generic (non-personalized) knowledge source, or a personalized knowledge source that can be further personalized. In particular, the user history collection component 122 is configured to extract or otherwise collect personalized user history for a particular user. This personalized user history may be collected from a variety of personal sources 109. In one embodiment, any source can be utilized as long as it can be tied to the particular user, such as a source requiring a user identification or otherwise associated with the particular user. Collecting data from such sources allows the system to capture personal interests and intents of the user, which can then be used to predict or determine the likelihood of unseen queries (e.g., voice queries) for use in personalized language modeling. Understanding the user's interests and intents therefore helps to predict what the user may be interested in or what the user may ask about in future queries.

In addition to user history associated with just a particular user, in some embodiments, user history collection component 122 is also responsible for collecting history with respect to other users similar to the particular user, such as other users with similar user history including their interests and intents. In particular, where user history for a particular user is sparse or unknown, it may be helpful to bolster the user's personalized knowledge source with data from other users who share interests and intents similar to that particular user. By way of example and not limitation, it may be determined that the particular user has a high level of interest in movies generally, and frequently searches the web for cast information for various movies. Additionally, the user history for this user indicates that the user tends to purchase movies on occasion. Therefore, where a different user or a group of users are determined to have similar interests in movies, searching for casts of movies, and tending also to purchase the movies, data from those users' history may be mapped to the personalized knowledge source associated with the particular user in order to bolster the usefulness of the personalized knowledge source for speech recognition.

The user history parsing component 124 is generally configured to parse through the likely large amounts of data extracted or collected by the user history collection component 122 to identify any entity-related or user-action-related information. User actions, as used herein, refer to an action taken by the user that can provide information as to the user's intent and the user's interest level associated with a particular entity and/or entity-type. For instance, to continue with the example above, if the user is interested in movies and tends to make occasional movie purchases over a website, the action of making movie purchases can be identified, parsed, and mapped to the user's personal knowledge source.

User-action-related information can be particularly helpful for extending a user's personalized knowledge graph using data from other users because the actions can be used to determine whether the other users have interests or intents similar to those of the particular user. Another exemplary user action includes the user providing an indication that he or she "likes" some item (e.g., public figure, celebrity, book, movie, posting by another user) on a social networking site, for example. In some embodiments, the entities associated with whatever the user has "liked" can be identified by the user history parsing component 124.

In addition to parsing personalized user history associated with the particular user, in some embodiments, user history parsing component 124 is also responsible for parsing data associated with other users with interests and/or intents similar to a particular user, as described herein. In such embodiments, the parsed data associated with the other users may then be mapped to the particular user's personalized knowledge graph.

Knowledge source extending component 126 is configured to determine whether a particular user's personalized knowledge source should be extended and, in some embodiments, how it may be extended and to what extent. In one embodiment, where a user's personalized knowledge source is not heavily populated with mappings of information from the user's history, for example, if the counts or weights of entities in the knowledge source are not particularly high or have not met a threshold, it may be determined that the user's personalized knowledge source should be extended. Knowledge source extending component 126 may also be responsible for determining how the personal knowledge source should be extended. One aspect of this determination can include identifying other users or groups of users that are similar to the particular user. In one embodiment, the similar users may share population characteristics such as interest in a specific domain, types of queries performed (e.g., searching for cast members of movies), user actions (e.g., purchasing movies), etc.

In one embodiment, extending a personal knowledge source involves weighting entities and the entity-to-entity relationships in a target user's personalized knowledge source. The weighting may be based on a number of times that specific entities and relationships have been mapped from user history data. A similar weighting may be applied with respect to personalized knowledge sources of the other users. If the entities and entity-to-entity relationships in a specific portion of the target user's personalized knowledge source are of a similar weight (e.g., meet a minimum threshold of weighted values) to the same entities and entity-to-entity relationships in the same portion of the other users' personalized knowledge sources, it may be determined that the particular user and the other users have a similar interest in the subject matter of that portion of the knowledge graph.

In another embodiment, a popularity of entities in a knowledge source is utilized instead of or in addition to a count of how many times an entity has been mapped. For example, where a specific entity has a particularly high popularity (e.g., it is frequently queried, mentioned, posted about on social networking sites) for a group of other users, it can be predicted that the particular user also has an interest in that popular entity. Accordingly, the particular user's personalized knowledge source may be extended in regards to that entity, and may include an indication that the particular user is (or has a likelihood of being) interested in the portion of the personalized knowledge source for that entity.

In yet another embodiment, the user's personalized knowledge source may be used to determine a level of interest of the user in a first portion of the personalized knowledge source, such as a particular entity or entity-to-entity relationship. For example, determining a level of interest may comprise determining whether the user has met a certain threshold indicating a likelihood that the user (or other users) is interested in some portion of the knowledge source. Alternatively or in addition, there may be multiple levels of interest that can be met to quantify a user's interest in a portion of the knowledge source.

Mapping component 128 of personalized knowledge source generator 120 is configured to map data to a knowledge source. As described herein, the user history parsing component 124 generally identifies and extracts user history data such as entities and user actions from the personal sources. This data is then mapped to the knowledge source, thereby tailoring or personalizing the knowledge source to the user. The mapping of this data can occur in a number of ways. For example, as described above, each time a particular entity or entity-type is identified in a user's personal history information, the count of that entity or entity-type in the knowledge source can be increased, such that, at any particular time, an entity or entity-type has a count associated therewith. Thus, if an entity has been mapped ten times, the count associated with the entity in the personalized knowledge source may be 10. Or alternatively, in one embodiment, an algorithm may be used to calculate a weight for each entity, rather than a one-to-one count. The algorithm may consider other factors, such as where and/or how the entity (or entity-type) is mentioned or otherwise linked to the user or the context, for example. Accordingly, as used herein, the terms "mapping," "mapped to," or "aligned" are used broadly to mean increasing a count of, weighting, or creating an association with an entity, relation, entity-entity pair or entity-type in a knowledge source or other indicator for representing a user's interest in a specific portion of a knowledge source based on user history information.

Figure 2:
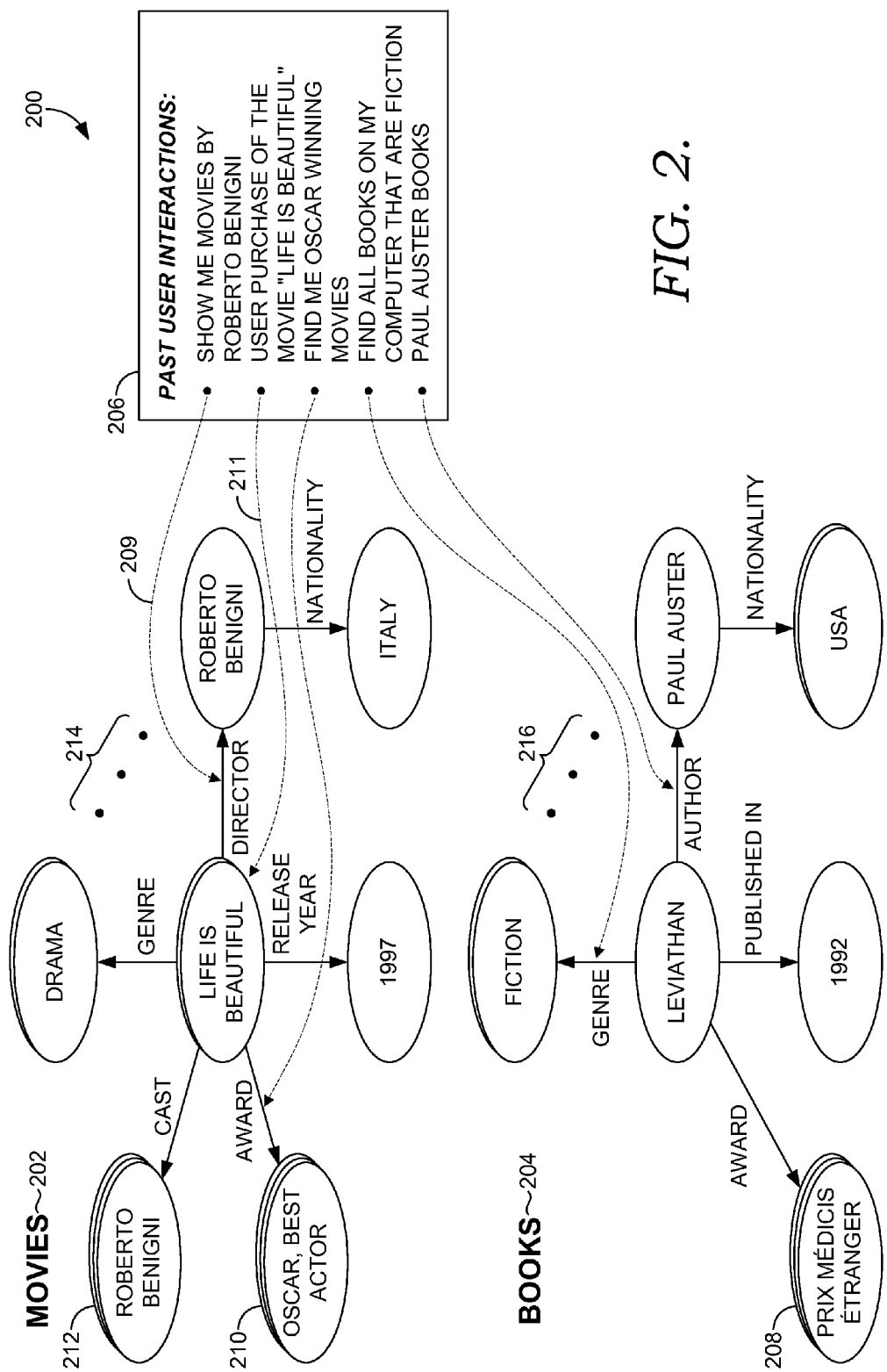
FIG. 2 depicts portions of one example of a personalized knowledge graph, in accordance with an embodiment of the invention.

Turning now to FIG. 2, aspects of a personalized knowledge source are depicted, in accordance with embodiments of the invention. By way of example, the personalized knowledge source of FIG. 2 comprises a personalized knowledge graph and is referred to generally as knowledge graph 200. Knowledge graph 200 represents one example of a knowledge source that may be personalized to a particular user. In particular, as described below, FIG. 2 illustrates an example of aligning user history information (in this case, past user utterances) to knowledge graph 200, and weighting the relations on the graph according to personal usage statistics from the user history.

A knowledge graph may be divided into multiple portions, with each portion referred to as a sub-graph. Two portions or sub-graphs of example knowledge graph 200 are shown in FIG. 2: a portion corresponding to movies domain 202 and a portion corresponding to a books domain 204. For the sake of clarity, movies domain 202 and books domain 204 each show only a subset of the entities and entity-to-entity relationships in the domain. Specifically, movies domain 202 is shown centered around the movie entity "*Life is Beautiful*" and books domain 204 is shown centered around the book entity "*Leviathan*." As the three dots (items 214 and 216) indicate, other sub-portions of the knowledge graph (e.g., other movies, other books) are present but are not shown.

Also shown in FIG. 2 is box 206 of user history information. In this example, the user history information includes past user interactions such as a previous query submitted by the user asking for movies by Roberto Benigni. Here, the entity "Roberto Benigni" and the entity relation "director" are identified from the user utterance and mapped (arrow 209) to knowledge graph 200. A second example shows a user action, indicating that the user has purchased a copy of the movie "*Life is Beautiful*." Arrow 211 shows how this user action is aligned to the "*Life is Beautiful*" entity in the knowledge graph 200. Similarly, box 206 shows examples of other user queries, which may come from one or more query logs associated with the user. These queries include, for example, asking for Oscar winning movies. Here, "Oscar" can be identified as an entity and mapped to the "Oscar, Best Actor" entity 210 in the knowledge graph and/or, as shown here, to the entity-entity relationship of "award" connected to the "Oscar, Best Actor" entity 210, because the user's intent is to identify movies that have been awarded an Oscar. The next example represents a query from a desktop (or user device) query log that includes past queries from the user conducted on a user device. Here, the user was searching for books saved locally on his or her user device that are fiction. Thus, "fiction" is recognized as an entity and may be mapped to the fiction entity and/or to the entity relationship "genre" connected to fiction, since the user's intent was to find books that are fiction.

Lastly, an example is provided of the user submitting a query for "Paul Auster books." As shown, the entity "Paul Auster" may be mapped to the user's personalized knowledge graph as an entity or as a relationship between the book (entity) "*Leviathan*" having the author (entity) of "Paul Auster." In this way, by mapping the example user history information provided in box 206 to the knowledge graph 200, the knowledge graph 200 becomes personalized to the user.

As further shown in FIG. 2, some entities, such as "Prix Medicis Etranger" 208, "Roberto Benigni" 212, and "Oscar, Best Actor" 210 may be determined to be of higher interest to this particular user, as indicated by oval shapes placed below the entity (e.g., representing a count) each time a mapping occurs to that entity. Alternatively, counts or weights associated with certain entities, entity-entity pairs, or relations can provide another indication (such as an associated value) that a user is interested in those entities, entity-entity pairs, or relations.

Figure 3:
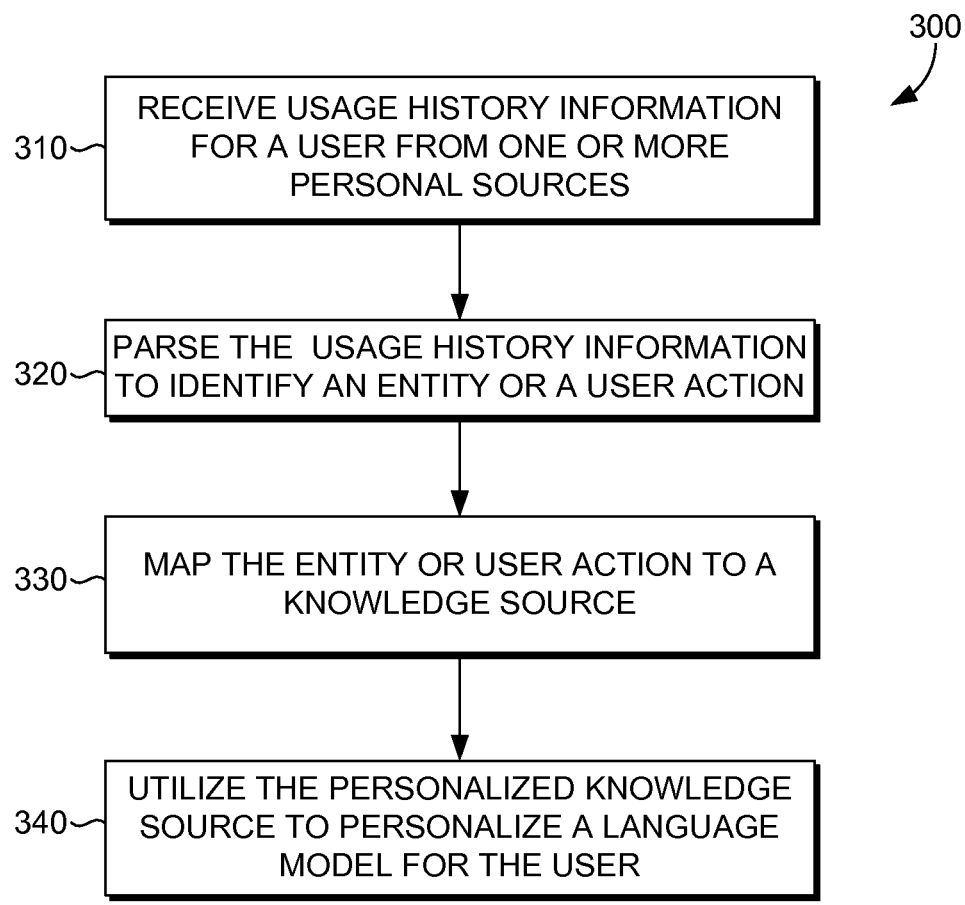
FIGS. 3-5 depict flow diagrams of methods for personalizing a language model for a particular user based on user history to better understand future queries of the particular user, in accordance with embodiments of the present invention.

Turning to FIG. 3, a flow diagram is provided illustrating one exemplary method 300 for personalizing a language model for a particular target user based on user history information. The personalized language models created according to method 300 may be used for speech recognition of the target user, such as by predicting future unseen queries (e.g., voice queries) submitted by the user.

At a high level, embodiments of method 300 first create a personalized knowledge source using various personal sources of information for the target user as well as available knowledge sources, which may include non-personalized knowledge sources or knowledge sources capable of being personalized to the target user. Information extracted from past utterances, user interactions, and other personal sources of user history information is aligned with the knowledge source. For example, entity-based similarity of users' past utterances to portions of the knowledge graph may be identified and mapped onto those portions. The entities and entity-types that appear in the user history may be tracked and their counts used when building personalized language models. One embodiment further includes using targeted spoken language understanding models for application domains to estimate a probability of a particular domain, given a past user utterance (or other user datum) and/or the probability of the user's intent and a particular relation, given the past user utterance.

P(domain|past user utterance), P(intent & relation|past user utterance)

The probabilities can be used to boost counts of specific parts of the knowledge source when building personalized language models, such as shown in FIG. 2.

Continuing with FIG. 3, at step 310 usage history information for a target user is received from one or more personal sources. Usage history includes data correlated with a target user that is collected from one or more personal sources, such as personal sources 109 described in connection to FIG. 1; for example, past user queries from query logs, website interactions, user actions, etc., performed by the target user via a user device. User intent may be inferred from the past behavior, which is represented by the usage history.

In one embodiment, usage history is collected and stored in a data store, such as storage 106 of FIG. 1. For example, where a target user is logged on to a user device, an application running on the device, or a specific website or online service, such as a search engine, information about usage history can be gathered and associated with the user. In one embodiment, addresses or pointers to the usage history information may be stored so that the usage history may be received and specific information may be parsed from the usage history in a next step.

At step 320, usage history information is parsed to identify one or more entities and/or user actions. In one embodiment, step 320 includes extracting the entities, including entity-entity pairs and entity relations, and/or user actions from the usage history information associated with the target user.

At step 330, the parsed entity or user action is mapped onto a knowledge source, thereby creating a personalized knowledge source and indicating portions of the knowledge source of most interest to the target user. Thus, personal interests and intents of the user, as represented by the usage history, are captured onto the personalized knowledge source and may then be used for personalized language modeling, such as predicting future unseen queries (e.g., voice queries). For example, user utterances or past interactions of the target user may be aligned onto a knowledge graph, such as described in connection to FIG. 2.

In one embodiment, step 330 comprises adapting existing language models, which may be represented by the knowledge source, to usage history of the target user, such as past utterances. Assuming users usually have requests for the conversational systems in line with their general interests, they may repeat requests from similar domains, and with similar intents, but where the arguments of the intent differ. Accordingly, by capturing the user's higher level interests and intents, language models can be created that anticipate similar intents, but with different arguments (i.e., arguments that do not appear in the usage history). As described above, in one embodiment, this is achieved by identifying entity-based similarities of usage history with portions of the knowledge source and mapping them onto the corresponding portion of the knowledge source. Thus, the entities and entity-types that appear in the user history are tracked and their counts used when building personalized language models. In some embodiments, the personalized knowledge source determined in this step represents a probabilistic knowledge source because usage statistics from the user history were utilized to weight (or add counts to) the relations and entities of the knowledge source.

At step 340, the personalized knowledge source is utilized to personalize (or train) a language model for the target user. At a high level, an embodiment of step 340 may comprise integrating the personalized probabilistic knowledge source into a personalized language model, such as by training a language model (e.g., N-gram) from queries corresponding to entities or entity-entity pairs that were identified in the usage history. A language model may be further trained for the target user by first training the model for the target user's queries and then interpolating it with the queries for the same entity or entity-entity pairs coming from all users. Alternatively, a language model for all users, such as a universal language model (ULM), may be trained for the target user's knowledge source space. In both cases, weights from the target user's knowledge source may be used to scale the counts of certain N-grams coming from other users' queries so that target user's interests or intents are still represented.

In one embodiment, personalized knowledge graphs associated with other users may be analyzed. From these personalized knowledge graphs, one or more of these other users may be identified as having interests and/or intents similar to the target user, such as by having commonly mapped entities and entity-to-entity relationships to those of the target user. In this way, entities and/or user actions associated with the other similar users may be mapped onto the target user's personalized knowledge graph. This augments the personalized knowledge graph of the target user so that the user's personalized language model is better suited to improve speech recognition. In one embodiment, similarity in interest and/or intent between two users or a group of users may be determined by comparing two probabilistic knowledge graph spaces associated with each user or group, where each space is represented with a probabilistic graph. Using this similarity metric, the interpolation weights may be evaluated to determine which weights will be used to interpolate a target user's personalized knowledge source with similar users' or user groups' sources.

Some embodiments of method 300 include utilizing social network interactions or other user inputs at similar networks for language model personalization by collecting, parsing, and mapping these interactions onto a knowledge source as described above. In some embodiments, the knowledge source is already personalized to a target user and may be further personalized or expanded by mapping social network interaction. In such embodiments or in embodiments where a target user's personalized knowledge source is expanded based on similarity with other users, the language models for the other similar users or social networking friends can be used to interpolate the target user's personalized language model. The new personalized language model then may be used to predict future queries of the target user, assuming that social networking friends will introduce some influence on future queries by a target user.

Figure 4:
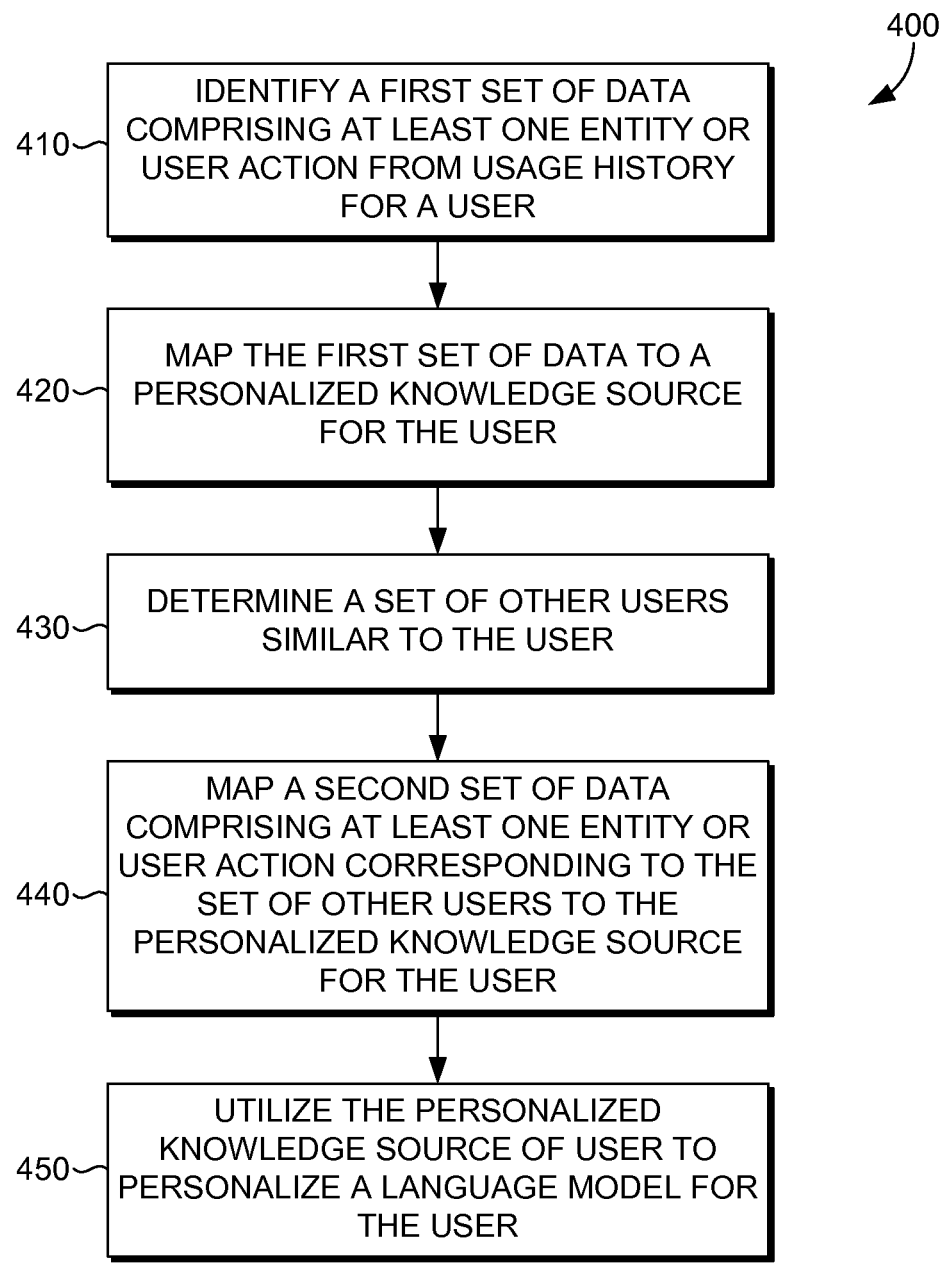

With reference now to FIG. 4, a flow diagram is provided illustrating an exemplary method 400 for personalizing a language model for a particular target user based on user history information and information from similar users. The personalized language model may be used for speech recognition of the target user, such as by predicting future unseen queries submitted by the target user.

At a high level, embodiments of method 400 may be used to "extend" a knowledge source personalized to a target user by incorporating information from knowledge sources personalized to similar users and/or social networking friends. One way a personalized knowledge graph may be extended is by using known personal relations. An example relation may include triplets like "works at <company>" or "is father of <contact>." Then sub-graphs of the web-scale knowledge graph, as activated by the previous usage history, may be augmented to this extended personal knowledge graph. In such embodiments, nodes and edges (e.g., entities and entity-to-entity relationships of a knowledge graph) are weighted with respect to the usage history so that language model training can benefit immediately. These weights may then determine the weight of the N-gram used to activate that part of the graph. Further, once a user has an extended personalized knowledge source, personalized knowledge sources of other users may be used to enhance the target user's knowledge source. For example, the target user's language model may be adapted using the language model of other users with prior weight based on contact frequency.

Similarly, a personalized knowledge source may be extended by utilizing knowledge sources of other users similar to the target user. For example, assuming each user has a personalized language model, which may be provided by a probabilistic personalized knowledge source determined based on their usage history and metadata, such as described in connection to FIG. 3, then language models may be created for different user-population characteristics. In one embodiment, similar users may be identified by clustering language models corresponding to the personalized knowledge sources of the users. Any of a number of various techniques for clustering, known by those skilled in the art, may be applied. In one embodiment, bottom-up clustering is applied, in which a pair of language models which are most similar to each other with respect to some metric are merged iteratively (combined with equal weights, in one embodiment). A symmetric Kullback Leibler distance, which is typically used to compute distance between two probability distributions, or a similar metric may be used. In another embodiment, K-Means clustering is applied, where the candidate language models are first separated into N bins for N number of clusters. A language model is computed using unweighted linear interpolation of the language models inside it. Each language model is then moved to the bin which is the most similar, again using some distance or similarity metric.

As a complementary approach, in some embodiments, in addition to lexical information, graph similarity based clustering methods can be used to cluster personalized knowledge graphs in order to identify groups of users with similar interests or intents. These embodiments, which may rely on action patterns of users, result in semantically clustered users. In one embodiment, methods for clustering database entries, such as latent semantic indexing (LSI), may be used. In some cases, where the knowledge source is a knowledge graph, the graph can be flattened into relation tables of semantic triples (relation/entity pairs, such as "Cameron-director-*Avatar*"). In these embodiments, instead of clustering graph entries, users are clustered based on their usage of the triples by simple table transformation. Once clusters are determined, they may be used to provide smoother language models because the models may be trained with greater numbers of similar data.

Continuing with FIG. 4, at step 410, a first set of data comprising at least one entity or at least one user action is identified from the usage history of a target user. The at least one entity may include one or more entities, entity-entity pairs, or entity relations corresponding to a knowledge source. In some embodiments, usage history, from one or more personal sources of information for the target user, is analyzed to identify the first set of data, and in some embodiments, the first set of data is parsed from the usage history as described in step 320 of FIG. 3.

At step 420, the first set of data is mapped to a personalized knowledge source for the target user. In an embodiment, the knowledge source comprises a generic (non-personalized) knowledge source that becomes personalized upon mapping the first set of data. Alternatively, in another embodiment, the first set of data is mapped onto a knowledge source that is already personalized to the target user, such as a personalized knowledge source created in accordance with method 300 of FIG. 3. In embodiments, the first set of data, which comprises at least one entity or user action, may be mapped as described in step 330 of FIG. 3.

At step 430, a set of users similar to the target user is determined. In one embodiment, one or more similar users are determined by clustering, such as described above. In one embodiment, step 430 includes weighting entities and the entity-to-entity relationships in a target user's personalized knowledge source. The weighting may be based on a number of times that specific entities and relationships have been mapped from user history data. A similar weighting may be applied with respect to personalized knowledge sources of the other users. If the entities and entity-to-entity relationships in a specific portion of the target user's personalized knowledge source are of a similar weight (e.g., meet a minimum threshold of weighted values) to the same entities and entity-to-entity relationships in the same portion of the other users' personalized knowledge sources, it may be determined that the target user and the other users have a similar interest in the subject matter of that portion of the knowledge graph.

In another embodiment, a popularity of entities in a knowledge source is utilized instead of a count of how many times an entity has been mapped. For example, if a specific entity has a particularly high popularity (e.g., it is frequently queried, mentioned, posted about on social networking sites) for a group of the target user's social networking friends, then there may be an increased likelihood the target user also has an interest in that popular entity. Accordingly, the target user's personalized knowledge source may be extended (as described in step 440) in regards to that entity, and may include an indication that the particular user is (or has a likelihood of being) interested in the portion of the personalized knowledge source for that entity.

In another embodiment, a level of interest of the target user and the other users is determined utilizing the target user's personalized knowledge source and the personalized knowledge sources of the other users. For instance, a level of interest may be compared in a first portion of the respective knowledge sources to determine if there are similar or overlapping interests between users. In one instance, it can be determined whether the determined level of interest meets a minimum threshold and also that the group of other users has a comparable level of interest in the first portion of the knowledge source to the target user's level of interest. While in one embodiment there is one threshold used to determine users' levels of interest, in a different embodiment, more than one threshold is used so that, for example, there may be a low level of interest threshold, a medium level of interest threshold, a high level of interest threshold, etc. The users that comprise the set of users who share similar interests to those of the target user, in one embodiment, have common interests to one another. Other methods for determining user similarity not specifically disclosed herein are contemplated to be within the scope of the invention.

At step 440, a second set of data corresponding to the set of users similar to the target user is mapped to the personalized knowledge source of the target user, thereby extending the target user's personalized knowledge source. The second set of data comprises at least one entity (including an entity-entity pair or entity relation) or user action. In some embodiments, the second set of data is identified and extracted from the personalized knowledge sources of similar users. In one embodiment, the second set of data includes the entity information and/or related metadata that is more frequently occurring in the personalized knowledge sources of the set of similar users, which may be determined by a threshold. At step 450, the personalized knowledge source for the target user, which has been extended, is utilized to personalize (or train) a language model for the target user. Embodiments of step 450 are similar to embodiments described in connection to step 340 of method 300 (FIG. 3).

Figure 5:
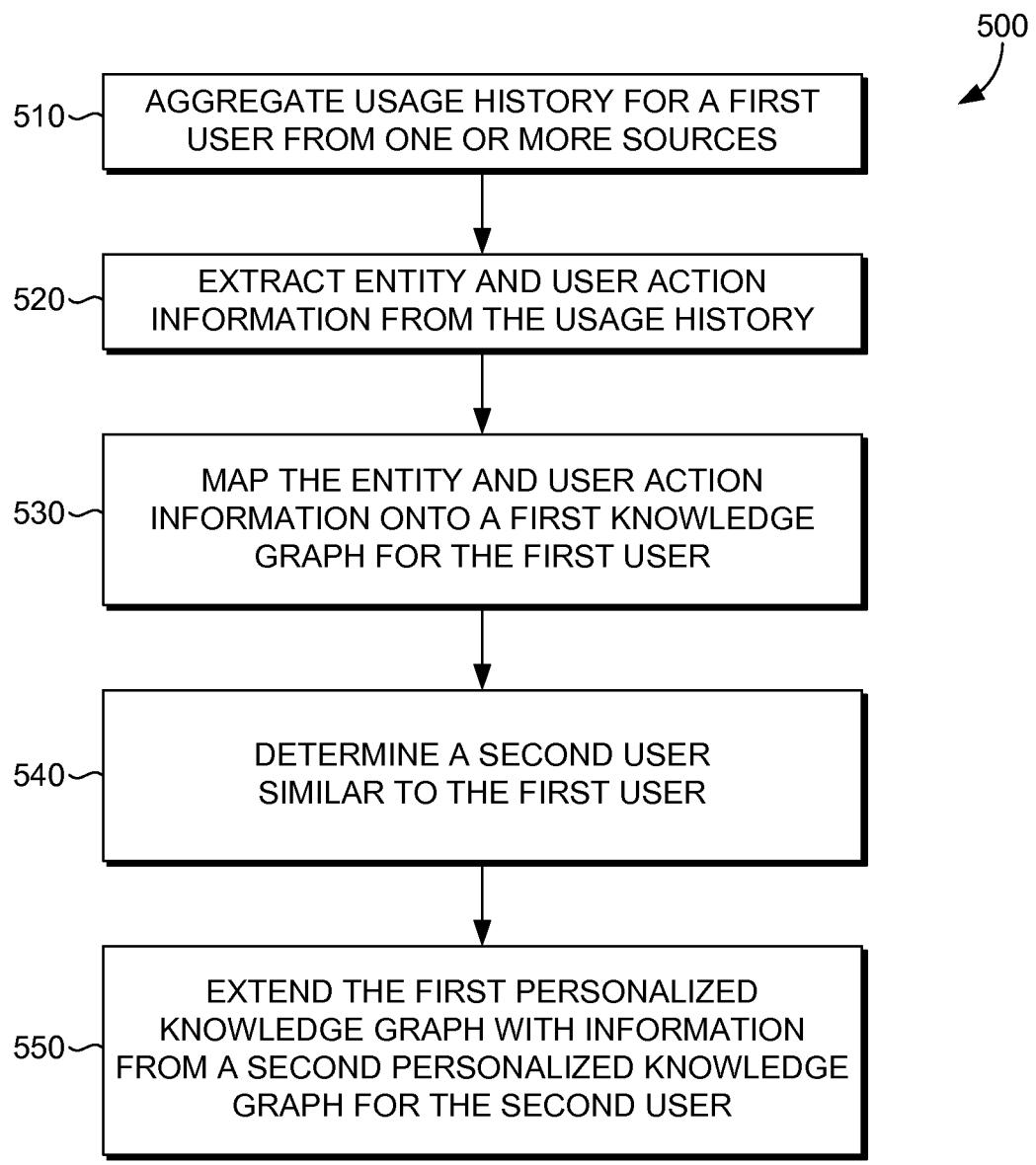

Turning to FIG. 5, a flow diagram is provided illustrating an exemplary method 500 for extending a knowledge graph personalized for a target user. The extended personalized knowledge graph may be used to personalize a language model for the target user. The personalized language model may be used for speech recognition of the target user, such as by predicting future unseen queries submitted by the target user.

At step 510, usage history, from one or more personal sources associated with a first user, is aggregated. Usage history includes data correlated with the first user from one or more personal sources, such as personal sources 109 described in connection to FIG. 1. For example, past user queries from query logs, website interactions, user actions, etc., performed by the first user via a user device.

At step 520, entity and user action information are extracted from the first user's aggregated usage history. The entity and user action information may include one or more entities, entity-entity pairs, entity relations, or user action related information. In one embodiment, the entity and user action information are parsed from the aggregated usage history as described in step 320 of method 300 (FIG. 3).

At step 530, the entity and user action information extracted in step 520 are mapped onto a first knowledge graph associated with the first user, thereby personalizing the first knowledge graph for the user. In one embodiment, the mapping operation performed in step 530 is similar to the mapping operation described at step 330 of method 300 (FIG. 3), where the knowledge source is a knowledge graph.

At step 540, a second user similar to the first user is determined. In one embodiment, step 540 comprises identifying a second user similar to the first user by determining that a personalized knowledge graph for the second user is similar to the personalized knowledge graph of the first user. In one embodiment, the second user is from a set of similar users determined by clustering or other ways as described in step 430 of method 400 (FIG. 4). As described previously, based on the determined similarity between the first and second user, it can be predicted that the first and second user have a likelihood of sharing similar interests and intents.

At step 550, the first user's personalized knowledge graph is extended to include information from a personalized knowledge graph associated with the second (similar) user determined in step 540. In an embodiment, step 550 comprises mapping entity or user action information from the second user's personalized knowledge graph onto the first user's personalized knowledge graph. Some embodiments of step 550 are similar to embodiments described in connection to step 440 of method 400 (FIG. 4), where the knowledge source is a knowledge graph. In one embodiment, the second personalized knowledge graph is more developed (includes more information) than the first personalized knowledge graph prior to extending the first graph. In some embodiments of method 500, the extended personalized knowledge graph may be used to personalize a language model for the first user, such as described at step 450 of method 400 (FIG. 4).

Accordingly, we have described various aspects of technology directed to systems and methods for improving language models for speech recognition by tailoring knowledge sources utilized by the language models to specific users or user-population characteristics. In particular, knowledge sources, such as knowledge graphs, are personalized for a particular user by incorporating personal usage history information for that user. The usage history is thus expanded via the knowledge source to capture personal interests and predict unseen voice queries to be used for personalized language modeling.

In a similar way, SLU models may be adapted to personalized knowledge sources for use in natural language understanding systems (NLUs). For example, in one embodiment for creating a personalized SLU model, related entity patterns may be determined from personalized knowledge sources. These patterns may be used to improve prediction of entity slot types, such as by biasing or adapting the slot filling models to the personalized knowledge sources.

Further, it is also contemplated that embodiments of the invention may be applied to any task or application where language modeling or other statistical sequential modeling techniques are employed, including, by way of example and not limitation, applications on word sequences (e.g., spoken/text language understanding, syntactic/semantic parsing, or the like), language modeling in statistical machine translation, query auto-completion or suggestion, or other suitable tasks or applications.

It is understood that various features, sub-combinations and modifications of the embodiments described herein are of utility and may be employed in other embodiments without reference to other features or sub-combinations. Moreover, the order and sequences of steps shown in the example methods 300, 400, and 500 are not meant to limit the scope of the present invention in any way, and in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 present data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, communication component (e.g., network communication component, radio or wireless communications component, or the like), etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Accordingly, in one aspect, an embodiment of the invention is directed to one or more computer-readable media having computer-executable instructions embodied thereon that, when executed by a computing system having a processor and memory, cause the computing system to perform a method for personalizing a language model for a particular target user based on user history information. The method includes receiving usage history information for a target user from one or more sources, parsing the usage history information to identify one or more of an entity or a user action, and mapping the one or more of the entity or the user action to a knowledge source, such as a knowledge graph, thereby creating a personalized knowledge source. In one embodiment, the method further includes utilizing the personalized knowledge source to personalize a language model for the target user.

In another aspect, one or more computer-readable media having computer-executable instructions embodied thereon are provided that, when executed by a computing system having a processor and memory, cause the computing system to perform a method for personalizing a language model for a particular target user. The method includes identifying a first set of data from usage history associated with the target user, the first set of data comprising at least one entity or user action, and mapping the first set of data to a personalized knowledge source for the target user. The method further includes determining a set of users similar to the target user, and mapping a second set of data to the personalized knowledge source for the target user, the second set of data comprising at least one entity or user action corresponding to the set of users similar to the target user, thereby creating an extended personalized knowledge source. In one embodiment, the method further includes utilizing the extended personalized knowledge source to personalize a language model for the target user.

In yet another aspect, an embodiment of the invention is directed to one or more computer-readable media having computer-executable instructions embodied thereon that, when executed by a computing system having a processor and memory, cause the computing system to perform a method for extending a knowledge graph personalized for a target user. The method includes aggregating usage history for a first user from one or more sources, extracting entity and user action information from the usage history, and mapping the extracted entity and user action information onto a first knowledge graph for the first user, thereby creating a first personalized knowledge graph. The method further includes determining a second user similar to the first user and extending the first personalized knowledge graph with information from a second personalized knowledge graph for the second user. In an embodiment, the method also includes utilizing the extended first personalized knowledge graph to personalize a language model for the first user.

What is claimed is:

1. One or more computer storage media having computer-executable instructions embodied thereon that, when executed by a computing system having a processor and memory, cause the computing system to personalize a language model for a particular target user based on user history information, the computer-executable instructions causing the computing system to:
   receive usage history information for a target user from one or more sources;
   parse the usage history information to identify entities and user actions associated with the entities;
   access a generalized knowledge source that is not personalized for the user, wherein the generalized knowledge source comprises indicators of relationships between entities in a domain;
   map the identified entities and the identified user actions to the generalized knowledge source, thereby creating a personalized knowledge source, the personalized knowledge source comprising indicators of relationships between the identified entities and the identified user actions, and the entities in the domain, the indicators comprising probabilities associated with the relationships, and the mapping comprising at least one of incrementing a count of one or more entities or calculating a weight of one or more entities;
   utilize the entities, relationships, and probabilities in the personalized knowledge source to build a personal language model for the target user; and
   utilize the personal language model for computer-performed speech recognition or spoken language understanding for the target user.

2. The one or more computer storage media of claim 1, wherein a knowledge source comprises a knowledge graph and the personalized knowledge source comprises a personalized knowledge graph.

3. The one or more computer storage media of claim 1, wherein the usage history comprises data that is correlated with the target user and that results from an action the target user has taken with respect to a user device.

4. The one or more computer storage media of claim 1, wherein the one or more sources comprise one or more query logs associated with the target user, websites visited by the target user, online purchase history of the target user; social networking interactions performed by the target user, or actions taken on a user device by the target user.

5. The one or more computer storage media of claim 1, wherein the parsing of the usage history information further comprises extracting the one or more of the entity or the user action from the usage history.

6. The one or more computer storage media of claim 1, wherein the user action comprises a selection of a link to a web page by the target user or a purchase of an item on a web page by the target user.

7. The one or more computer storage media of claim 1, wherein the personalized knowledge graph is used to infer user intent from the user's past behavior.

8. The one or more computer storage media of claim 1, wherein utilizing the personalized knowledge source to personalize a language model for the user includes training a generic language model from queries corresponding to entity information identified in the usage history.

9. One or more computer storage media having computer-executable instructions embodied thereon that, when executed by a computing system having a processor and memory, cause the computing system to personalize a language model for a particular target user, the computer-executable instructions causing the computing system to:
identify a first set of data from usage history associated with the target user, the first set of data comprising at least one entity or user action;
analyzing the usage history information for statistical data;
map the first set of data to a personalized knowledge source for the target user, wherein the mapping comprises assigning probabilities to entities and relationships in the personalized knowledge source based on the statistical data, thereby providing a probabilistic personalized knowledge source;
determine a set of users similar to the target user;
map a second set of data to the personalized knowledge source for the target user, the second set of data comprising at least one entity or user action corresponding to the set of users similar to the target user, thereby creating an extended personalized knowledge source, the extended personalized knowledge source comprising a second entity and a triple indicating a relationship between the at least one entity or user action and the second entity, the mapping comprising at least one of incrementing a count of the one or more of the entity or calculating a weight of the one or more of the entity; and
utilize the extended personalized knowledge source to build a personal language model for the target user for speech recognition.

10. The one or more computer storage media of claim 9, the computer-executable instructions further causing the computing system to predict future queries submitted by the target user.

11. The one or more computer storage media of claim 9, wherein the personalized knowledge source comprises a personalized knowledge graph and the extended personalized knowledge source comprises an extended personalized knowledge graph.

12. The one or more computer storage media of claim 9, wherein determining the set of users similar to the target user includes performing a clustering algorithm.

13. The one or more computer storage media of claim 9, wherein the set of users share similar interests or intents with the target user.

14. The one or more computer storage media of claim 9, wherein the set of users similar to the target user are determined to be semantically similar.

15. The one or more computer storage media of claim 9, wherein the personalized knowledge source includes one or more entities and entity relations, and further comprising weighting the one or more entities and entity relations based on a number of times that the entities and entity relations occur in the first set of data.

16. The one or more computer storage media of claim 9, wherein usage history comprises information from one or more query logs associated with the target user, websites visited by the target user, online purchase history of the target user; social networking interactions performed by the target user, or actions taken on a user device by the target user.

17. A computing system for extending a knowledge graph personalized for a target user, comprising:
one or more computer processors;
computer memory storing computer-useable instructions that, when used by the one or more computer processors, cause the one or more computer processors to perform operations comprising:
aggregating usage history for a first user from one or more sources, wherein the usage history for the first user comprises one or more past user utterances;
extracting entity and user action information from the usage history;
mapping the extracted entity and user action information onto a first knowledge graph for the first user, thereby creating a first personalized knowledge graph, the first personalized knowledge graph comprising a second entity and a triple indicating a relationship between the extracted entity and user action information and the second entity, the mapping comprising at least one of incrementing a count of the one or more of the entity or calculating a weight of the one or more of the entity;
determining a second user similar to the first user;
extending the first personalized knowledge graph with information from a second personalized knowledge graph for the second user;
utilizing the extended first personalized knowledge graph to personalize a language model for the second user thereby forming a second-user personalized language model; and
utilizing the second-user personalized language model for computer-performed speech recognition or spoken language understanding for the second user.

18. The computing system of claim 17, wherein information from the second personalized knowledge graph comprises entity or user action information from the second user's personalized knowledge graph.

19. The computing system of claim 17, the computer-executable instructions further causing the computing system to utilize the extended first personalized knowledge graph to personalize a language model for the first user thereby forming a first-user personalized language model.

20. The computing system of claim 17, wherein the second user is determined to be similar to the first user based on clustering or a relationship with the first user in a social network.

* * * * *